United States Patent
Vaidyanathan et al.

(10) Patent No.: US 8,081,700 B2
(45) Date of Patent: Dec. 20, 2011

(54) POWER ALLOCATION METHOD FOR MIMO TRANSMIT BEAMFORMING

(75) Inventors: Karthik Vaidyanathan, Bangalore (IN); Sailaja Dharani Naga Sankabathula, San Jose, CA (US)

(73) Assignee: Redpine Signals, Inc., San Jose, CA (US)

( * ) Notice: Subject to any disclaimer, the term of this patent is extended or adjusted under 35 U.S.C. 154(b) by 713 days.

(21) Appl. No.: 12/134,215

(22) Filed: Jun. 6, 2008

(65) Prior Publication Data

US 2009/0304103 A1 Dec. 10, 2009

(51) Int. Cl.
*H04B 7/02* (2006.01)
*H04L 1/02* (2006.01)

(52) U.S. Cl. ...................................... 375/267

(58) Field of Classification Search .................. 375/259, 375/260, 262, 267, 285, 295, 299, 316; 370/328, 370/329, 338; 455/69, 101, 522, 562.1
See application file for complete search history.

(56) References Cited

U.S. PATENT DOCUMENTS

| | | | |
|---|---|---|---|
| 2005/0094598 A1* | 5/2005 | Medvedev et al. | 370/329 |
| 2006/0155798 A1* | 7/2006 | Ketchum et al. | 708/607 |
| 2007/0191066 A1* | 8/2007 | Khojastepour et al. | 455/562.1 |
| 2007/0268181 A1* | 11/2007 | Howard et al. | 342/368 |
| 2008/0080634 A1* | 4/2008 | Kotecha et al. | 375/267 |
| 2008/0304464 A1* | 12/2008 | Borkar et al. | 370/342 |
| 2008/0311859 A1* | 12/2008 | Ponnampalam et al. | 455/69 |

\* cited by examiner

*Primary Examiner* — David C. Payne
*Assistant Examiner* — Syed Haider
(74) *Attorney, Agent, or Firm* — File-EE-Patents.com; Jay A. Chesavage

(57) ABSTRACT

A transmit power allocation method for computing a transmit beamforming W matrix for a N streams of data, the method has a first step of measuring a receive channel characteristic H matrix, a second step of decomposing the H matrix into a U matrix which is formed from the left eigenvectors of the H matrix, an $\Sigma$ matrix which is a diagonal matrix formed from the square roots of the eigenvalues of said H matrix and re-ordered by strength, and a $V^T$ matrix with rows comprising the right eigenvectors of H, such that $U\Sigma V^T$=H. The transmit beamforming W matrix is then formed from the re-ordered V matrix of the previous decomposition. Optional waterfilling methods for a plurality of subcarriers may then be done using either a minimum mean square error, an optimal signal to noise ratio, or any other waterfilling method which optimizes a desired metric, such as signal to noise ratio or minimum mean square error.

14 Claims, 6 Drawing Sheets

MIMO 2x2 two-stream
Transmitter/Receiver Link
Prior Art

MIMO 3x3 two-stream
Transmitter/Receiver Link
Prior Art

Figure 3

W computation by sorting eigenvalues

W computation using accumulated stream strengths ns8081700B2
POWER ALLOCATION METHOD FOR MIMO TRANSMIT BEAMFORMING

FIELD OF THE INVENTION

The present invention relates to frequency domain beamforming for use in a multiple-input multiple-output (MIMO) wireless system having a plurality of transmit antennas. In particular, the present invention relates to improving channel performance by changing transmit channel subcarrier levels, thereby improving the performance of a remote receiver having one or more receive antennas and associated signal processing paths receiving the signal streams which have been beamformed by the transmitter.

BACKGROUND OF THE INVENTION

Beamforming in MIMO systems is a well known technique that improves the performance of a wireless link using multiple antennas at the transmitter and receiver, and prior knowledge of the channel characteristic. In MIMO systems, the input symbols are mixed across the transmit antennas such that the MIMO channel signal level observed by the receiver is improved. The modulation method Orthogonal Frequency Division Multiplexing (OFDM) simplifies wideband beamforming by separating a frequency selective wideband channel into multiple subcarriers, each subcarrier occupying a narrowband spectrum of the wideband channel. Each subcarrier can be beamformed in the frequency domain using narrowband beamforming techniques known in the prior-art. Beamforming is currently supported by OFDM based IEEE wireless local area network (WLAN) standards such as IEEE WLAN 802.11n and 802.16e.

FIG. 1 shows a wireless MIMO link with two input spatial streams S1, S2 104 applied to MIMO transmitter 102 which combines them in a separable manner, and couples them to transmit output antennas 106, 108. MIMO receiver 114 receives the combined streams on antennas 110 and 112 and processes the received signals to decode two receive streams R1, R2, 116 which carry the same information as original streams S1 and S2 104. The transmit antennas 106 and 108 carry transmit streams X1 and X2, respectively, and the receive antennas 110 and 112 receive combined signals Y1 and Y2, respectively. The generalized linear equations of operation for FIG. 1 are:

$$Y = HWS + N$$

where:
Y is the receive matrix,
H is the channel characterization matrix,
W is the transmit beamforming matrix,
S is a matrix contains the streams of data to be transmitted, and
N is system noise.

The following equations describe the matrix form of the 2×2 MIMO system of FIG. 1:

$$\begin{bmatrix} y1 \\ y2 \end{bmatrix} = \begin{bmatrix} h11 & h12 \\ h21 & h22 \end{bmatrix} * \begin{bmatrix} w11 & w12 \\ w21 & w22 \end{bmatrix} * \begin{bmatrix} s1 \\ s2 \end{bmatrix} + \begin{bmatrix} n1 \\ n2 \end{bmatrix}$$

FIG. 2 shows a transmitter and receiver link across a wireless channel for 3×3 MIMO with two spatial input streams S1, S2 202, which are mixed and transmitted over three antennas. The associated transmitted signals x1, x2, and x3 are modified by a beamforming matrix W 212 which is preceded and followed by signal processing 214 and 210, respectively, further modified by the communication channel which is represented by the channel matrix H, and arrive at the receiver 206 antennas Y1, Y2, Y3. Each of the receiver antennas gathers a sum of modified signals from each of the transmitted antennas, which can be represented as:

$$\begin{bmatrix} y1 \\ y2 \\ y3 \end{bmatrix} = \begin{bmatrix} h11 & h12 & h13 \\ h21 & h22 & h23 \\ h31 & h32 & h33 \end{bmatrix} * \begin{bmatrix} w11 & w12 \\ w21 & w22 \\ w31 & w32 \end{bmatrix} * \begin{bmatrix} s1 \\ s2 \end{bmatrix} + \begin{bmatrix} n1 \\ n2 \\ n3 \end{bmatrix}$$

where:
yk is the received signal at the kth receive path
hik is the channel between the ith transmit antenna and the kth receive antenna
nk is the noise signal at the kth receive path
s1, s2 are the two transmitted symbols
wi, j are the beamforming coefficients and W is the beamforming (mixing) matrix The value transmitted on each antenna x can be represented as $$\begin{bmatrix} x1 \\ x2 \\ x3 \end{bmatrix} = \begin{bmatrix} w11 & w12 \\ w21 & w22 \\ w31 & w32 \end{bmatrix} * \begin{bmatrix} s1 \\ s2 \end{bmatrix}$$

By computing the values of W using knowledge of the channel characteristic H, it is possible to improve the receive signal quality at the receiver.

OBJECTS OF THE INVENTION

A first object of this invention is the computation of a beamforming matrix W by performing a singular value decomposition of the receive channel characteristic H matrix, the decomposition forming a U matrix which is formed from the left eigenvectors of H, an Z matrix which is a diagonal matrix consisting of the square roots of the eigenvalues of H re-ordered by strength, and a $V^T$ matrix with rows comprising the right eigenvectors of H, such that $U\Sigma V^T = H$, whereafter the W matrix used for beamforming is derived from the V matrix.

A second object of the invention is the generation of a beamforming matrix W by performing a singular value decomposition of the receive channel characteristic H matrix, the decomposition forming a U matrix which is formed from the left eigenvectors of H, an $\Sigma$ matrix which is a diagonal matrix consisting of the square roots of the eigenvalues of H re-ordered by strength, and a $V^T$ matrix with rows comprising the right eigenvectors of H, such that $U\Sigma V^T = H$, whereafter the W matrix used for beamforming is derived from the V matrix, and the W matrix is subsequently modified by waterfilling each subcarrier.

SUMMARY OF THE INVENTION

In a MIMO system supporting N streams of data, a first step is performed whereby a receive channel characteristic matrix H is decomposed into a U matrix which is formed from the left eigenvectors of H, an $\Sigma$ matrix which is a diagonal matrix consisting of the square roots of the eigenvalues of H ordered by strength where $\lambda_1$ corresponds to the strongest eigenvalue and $\lambda_N$ corresponds to the weakest eigenvalue, and a $V^T$ matrix with rows comprising the right eigenvectors of H, such that $U\Sigma V^T = H$. The singular value decomposition operation inherently provides the engenvalues in descending order with stream 1 having the stronger eigenvalue.

In a second step, all the N subcarrier eigenvalues $\lambda_{k,1}$ of the first stream are sorted across subcarriers (k) in descending order, with the strongest eigenvalues being $\lambda'_{1,1}$. The eigenvalues of the second stream are already paired with their corresponding eigenvalues from the first stream. Therefore, as a result of sorting $\lambda_{k,1}$, if the subcarrier index k of a particular eigenvalue changes, the index of its pair $\lambda_{k,2}$ also changes. The sorted eigenvalue pairs $\lambda'_{k,m}$ are then alternately distributed to the two streams. Of the first eigenvalue pair $\lambda'_{1,1}$ and $\lambda'_{1,2}$, $\lambda'_{1,1}$ is assigned to stream 1 and $\lambda'_{1,2}$ is assigned to stream 2 and in case of the second eigenvalue pair $\lambda'_{2,1}$ and $\lambda'_{2,2}$, $\lambda'_{2,1}$ is assigned to stream 2 and $\lambda'_{2,2}$ is assigned to stream 1. If an eigenvalue $\lambda'_{k,1}$ is assigned to one stream the corresponding weaker eigenvalue $\lambda'_{k,2}$ of the pair is automatically assigned to the other stream. This has the effect of swapping the eigenvalues across streams for a few subcarriers. This can be achieved by using the V matrix for the beamforming matrix W, by switching the columns of the V matrix.

$$W = V' = \begin{bmatrix} v12 & v11 \\ v22 & v21 \\ v32 & v31 \end{bmatrix}$$

After the eigenvaues are assigned to alternate streams, the eigenvalues $\lambda'_{k,m}$ are reassigned to their original subcarrier positions $\lambda''_{k,m}$.

In a third step after the eigenvaues are assigned to alternate streams, a waterfilling technique such as minimum mean square error (MMSE) is applied to each stream independently, such that for N=2:

$$\phi_{k,1}^2 = (\mu(v/\lambda''_{k,1})^{1/2} - v/\lambda''_{k,1})$$

$$\sum \phi_{k,1}^2 = Nsubcarriers/Nstreams$$

and $$\phi_{k,2}^2 = (\mu(v/\lambda''_{k,2})^{1/2} - v/\lambda''_{k,2})$$

$$\sum \phi_{k,2}^2 = Nsubcarriers/Nstreams$$

where:
$\Phi_{k,m}$ = amplitude of subcarrier k for stream m;
v = noise variance;
$\mu$ is the waterfilling limit.
The final beamforming matrix W (for N=2) is given by $$W' = \begin{bmatrix} v'11 & v'12 \\ v'21 & v'22 \\ v'31 & v'32 \end{bmatrix} * \begin{bmatrix} \varphi1 & 0 \\ 0 & \varphi2 \end{bmatrix}$$

BRIEF DESCRIPTION OF THE DRAWINGS

FIG. 3 shows a block diagram for a MIMO RF receiver and transmitter.

DETAILED DESCRIPTION OF THE INVENTION

Figure 1:
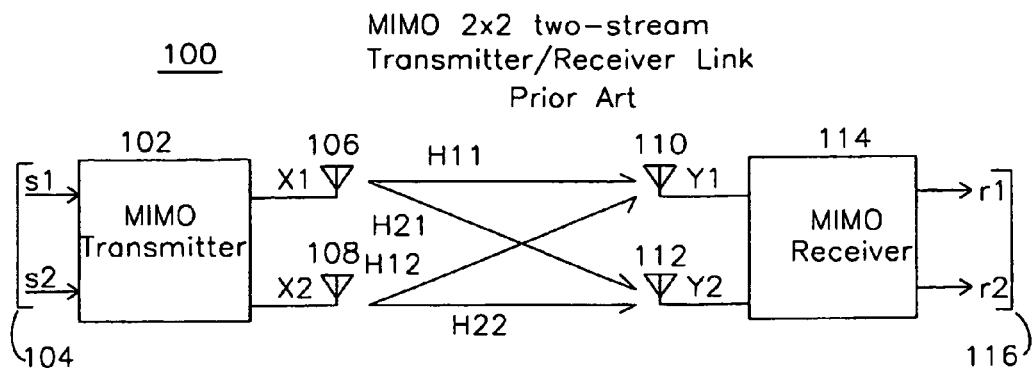
FIG. 1 shows a block diagram for a 2×2 MIMO transmitter and receiver with 2 streams of data.
Figure 2:
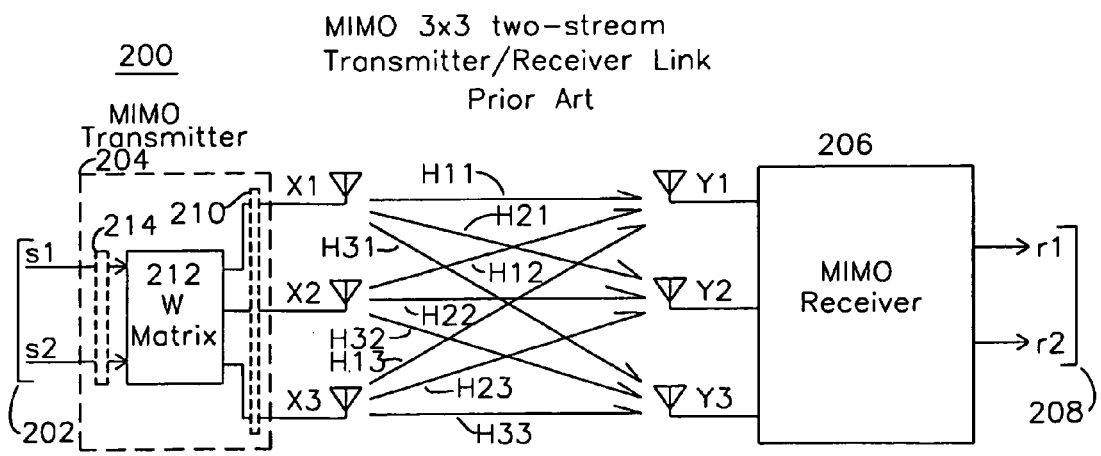
FIG. 2 shows a block diagram for a 3×3 MIMO transmitter and receiver with 2 streams of data.
Figure 3:
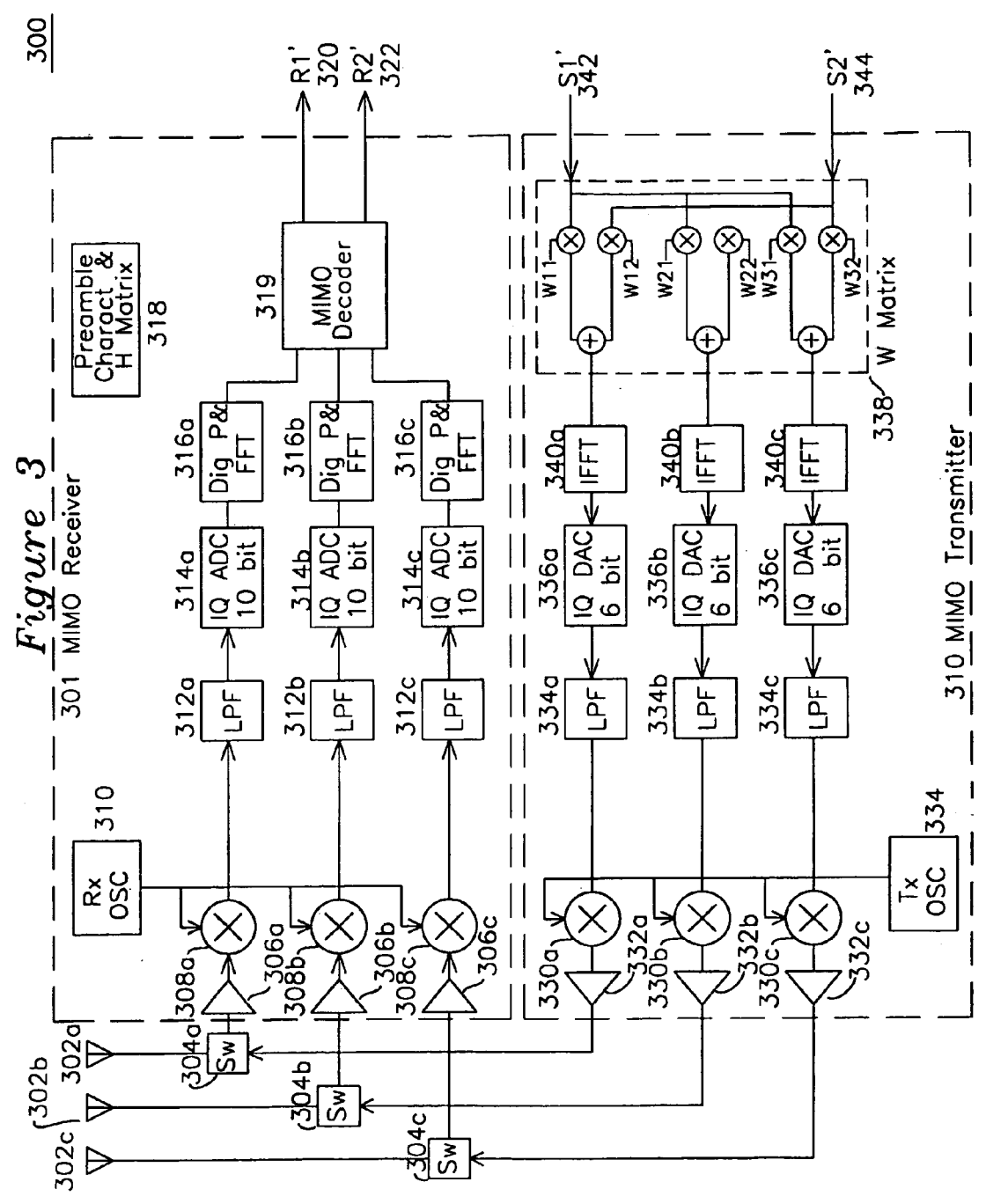

FIG. 3 shows an example wireless receiver and transmitter according to an embodiment of the present invention. Signals entering each antenna 302a, 302b, 302c are processed by individual analog processing streams including switch/filter 304a, RF amplifier 306a, quadrature mixer 308a for mixing from a quadrature oscillator 310 thereby producing a baseband signal which is filtered 312a and sampled 314a to a stream of digital values. These values are digitally equalized such as by a baseband processor, and for OFDM encoding used in MIMO, decoded into individual outputs by FFT 316a. The processing for the other channels is identical, shown with the suffix 'b' and 'c', such that for a 3×3 MIMO system and OFDM modulation, FFT outputs 316a, 316b, 316c are provided to a MIMO decoder 319 for decoding into individual streams R1' 320 and R2' 322. Transmit processing similarly starts with two streams of data S1' 342 and S2' 344, which are provided to a W matrix computation 338, which operates according to the matrix multiplication above to form x1, x2, x3, the three streams of beamformed data. These three streams are inverse fourier transformed 340a, 340b, 340c, respectively, to generate subcarriers which are converted to analog 336a, 336b, 336c, respectively, low pass filtered 334a, 334b, 334c, respectively, modulated to the transmit frequency 334 using mixers 330a, 330b, 330c, respectively, amplified 330a, 330b, 330c and switched 304a, 304b, 304c, respectively, to antennas 302a, 302b, 302c, respectively. During a receive preamble interval, each channel is characterized and an H matrix is formed 318. This H matrix represents the channel characteristic from a remote transmitter to the present receive antenna, and using the principle of channel reciprocity, a beamformed W matrix is formed from H, and the W coefficients are applied to beamformer 338.

The beamforming coefficients of the W matrix can be computed based on an estimate of the transmit channel. This can be obtained from the receive channel estimates based on channel reciprocity:

$$\begin{bmatrix} h'11 & h'21 & h'31 \\ h'12 & h'22 & h'32 \\ h'13 & h'23 & h'33 \end{bmatrix} = \begin{bmatrix} h11 & h12 & h13 \\ h21 & h22 & h23 \\ h31 & h32 & h33 \end{bmatrix}$$

where H is the receive path channel and H' is the transmit path channel.

The transmit path channel can also be obtained explicitly from the destination receiver by encapsulating these values in a downstream packet using a variety of methods, including those described in the IEEE 802.11n standard, which provides support for both techniques for estimation of the transmit channel. The computed W beamforming coefficients are then optionally waterfilled by multiplication by a waterfilling matrix, and then applied as W' coefficients to the transmitted sub carriers.

Figure 4:
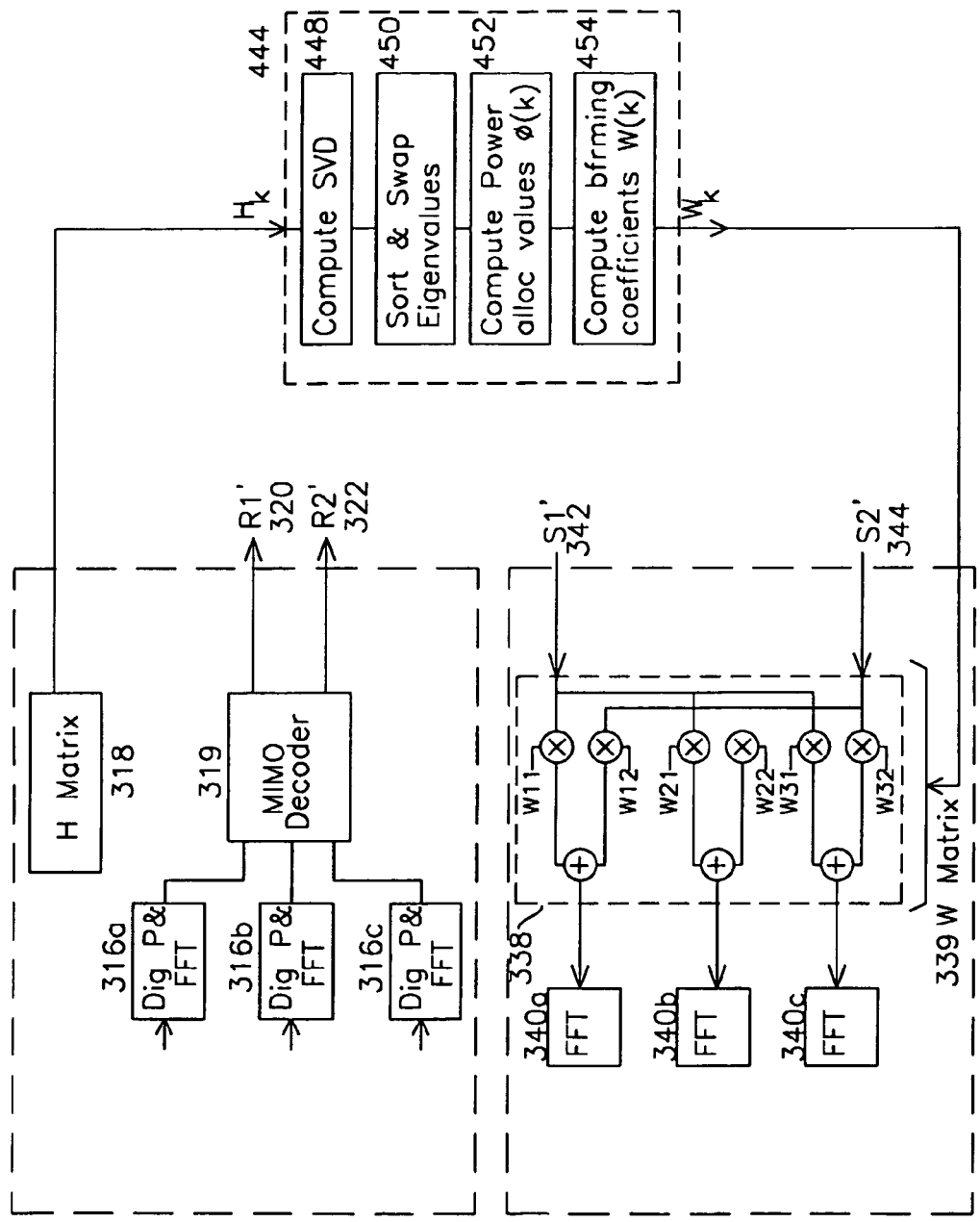
FIG. 4 shows a block diagram a beamforming processor forming a transmit beamforming matrix from a channel characterization matrix.

FIG. 4 shows the process 444 for deriving a W matrix 339 from the H matrix 318 of the receiver 301 of FIG. 3. In summary, process 444 includes the H matrix, which comprises complex channel transmission values for each transmit antenna to each receive antenna, and typically has these values for each subcarrier frequency. The H matrix undergoes a singular value decomposition 448, which identifies the eigenvalues. These matrix eigenvalues for each subcarrier frequency are sorted and swapped in step 450, and power allocation values for each subcarrier are computed in step 452, which may include waterfilling of certain subcarriers, after which the beamforming coefficients $W_k$ are computed in step 454, which $W_k$ values are provided to the W matrix 339 of the transmit beamformer 338.

Computing the singular value decomposition (SVD) of the H matrix for a particular subcarrier may be described as follows:

$$H = U\Sigma V^T$$

$$\begin{bmatrix} h11 & h12 & h13 \\ h21 & h22 & h23 \\ h31 & h32 & h33 \end{bmatrix} = \begin{bmatrix} u11 & u12 & u13 \\ u21 & u22 & u23 \\ u31 & u32 & u33 \end{bmatrix} * \begin{bmatrix} \lambda_1^{1/2} & 0 & 0 \\ 0 & \lambda_2^{1/2} & 0 \\ 0 & 0 & \lambda_3^{1/2} \end{bmatrix} *$$

$$\begin{bmatrix} v11 & v21 & v31 \\ v12 & v22 & v32 \\ v13 & v33 & v33 \end{bmatrix}$$

Where:

U is a 3×3 unitary matrix with columns comprising the left eigenvectors of H, $V^T$ is a 3×3 unitary matrix with rows comprising the right eigenvectors of H, Σ is a diagonal matrix consisting of the square root of the eigenvalues of H where $\lambda_1^{1/2}$ corresponds to the strongest eigenvalue and $\lambda_3^{1/2}$ corresponds to the weakest eigenvalue.

The left and right eigenvectors are orthogonal to each other (a dot product of any two eigenvectors results in a null) and can be used to decompose the MIMO channel into parallel single input single output (SISO) channels. Each of the three sets for a particular subcarrier frequency is known as an eigenmode, and each eigenmode comprises a left eigenvector, an eigenvalue and a right eigenvector. For example, [h11, h21, h31], $\lambda_1^{1/2}$, [v11, v21, v31] is the first eigenmode.

Figure 5:
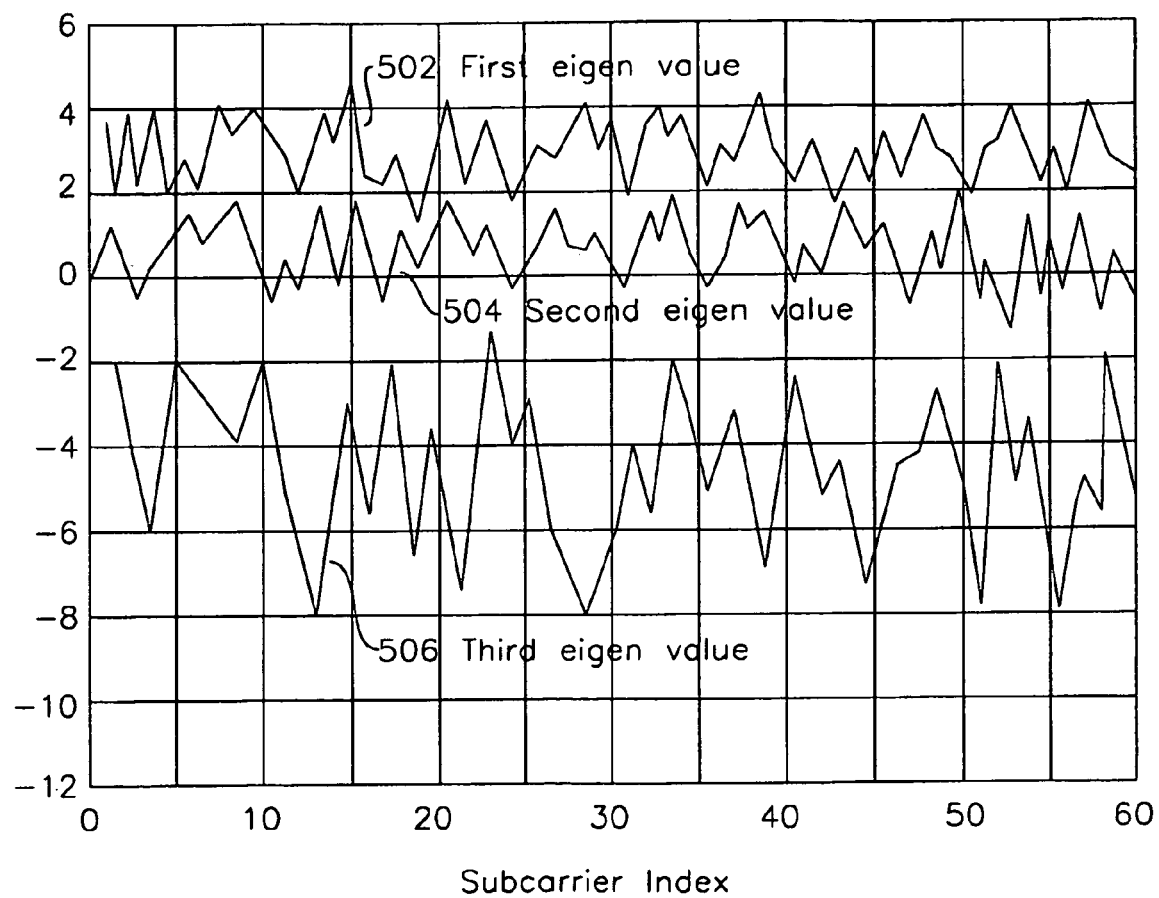
FIG. 5 shows a plot of Rayleigh fading for various Eigen values of the stream.

FIG. 5 shows the three eigenvalues for a 3×3 system. When the number of transmit-antennas is more than the number of streams; beamforming can use the two strongest eigenmodes for transmission, which leads to a significant improvement in MIMO performance.

Figure 6:
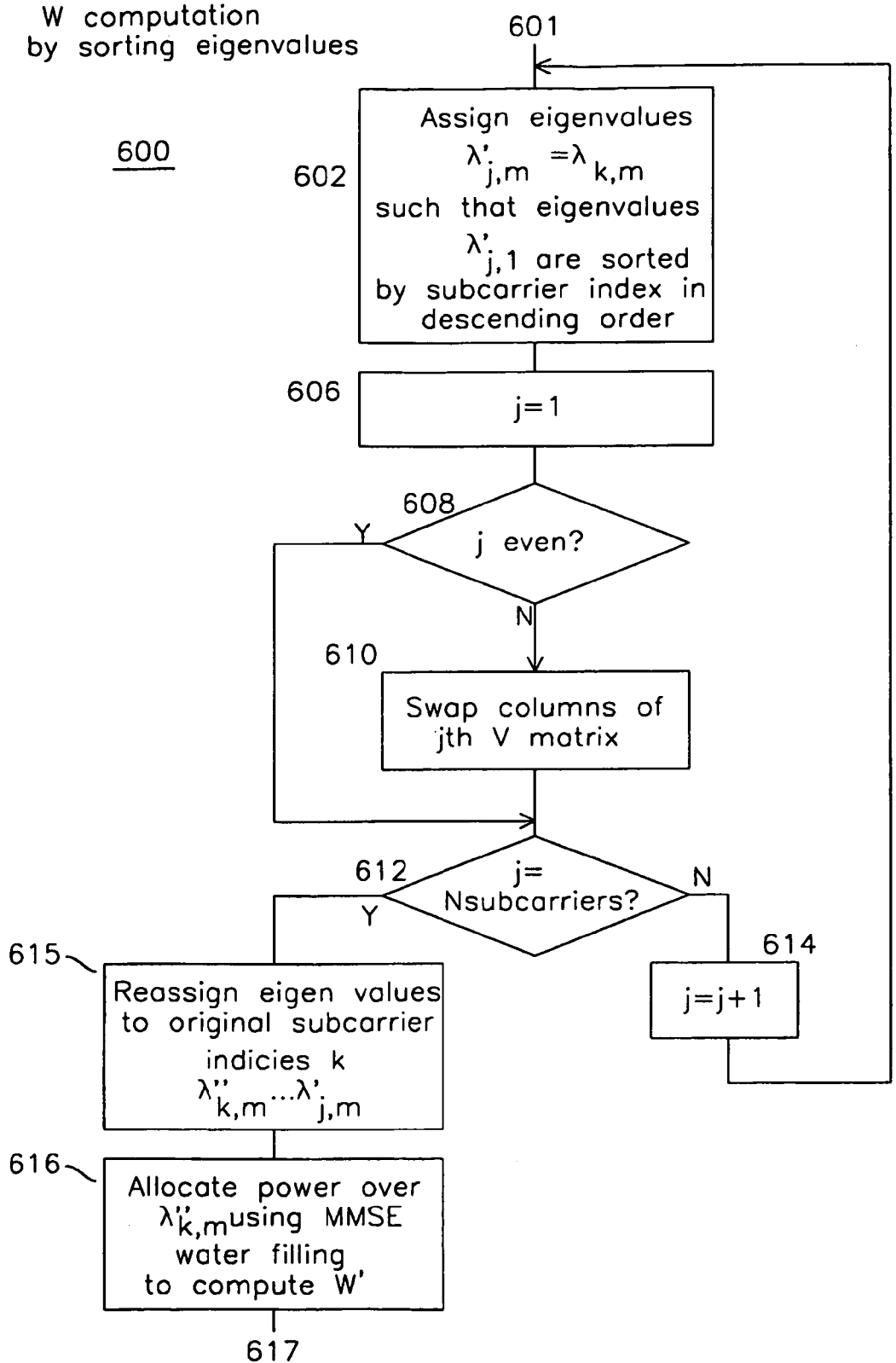
FIG. 6 shows a process for computing a W' matrix.

FIG. 6 shows a flowchart 600 for computation of the W matrix for use in beamforming in one embodiment of the present invention. The process is entered with the eigenvalues $\lambda_{subcarrier,stream}$ and associated V matrix from the decomposition described earlier. The eigenvalues $\lambda_{subcarrier,stream}$ are sorted for each subcarrier in descending order in step 602, and the subcarrier index j is initialized in step 606. For every other subcarrier, the associated W matrix columns for a particular subcarrier are swapped in step 610, thereby alternating the strength of the streams for a particular subcarrier. Step 612 tests for completion of this rearrangement, and either increments the subcarrier index 614 and continues arranging the V matrix in step 610, or completes and enters step 615, which re-assigns the eigenvalues to the original subcarrier indicies. In this manner, steps 602, 610, and 615 in combination result in the rearrangement of the V matrix, into a strongest and second strongest stream for each subcarrier, after which the re-arranged V matrix is used as the beamforming matrix W.

Step 610 accomplishes the transmission beamforming using the two strongest eigenmodes by selecting the first two columns of the V matrix as the beamforming matrix W.

$$W = \begin{bmatrix} v11 & v12 \\ v21 & v22 \\ v31 & v32 \end{bmatrix}$$

The resulting channel can be represented as:

$$H*W = (U\Sigma V^T)*W$$

$$H*W = \begin{bmatrix} u11 & u12 & u13 \\ u21 & u22 & u23 \\ u31 & u32 & u33 \end{bmatrix} * \begin{bmatrix} \lambda_1^{1/2} & 0 & 0 \\ 0 & \lambda_2^{1/2} & 0 \\ 0 & 0 & \lambda_3^{1/2} \end{bmatrix} *$$

$$\begin{bmatrix} v11 & v21 & v31 \\ v12 & v22 & v32 \\ v13 & v33 & v33 \end{bmatrix} * \begin{bmatrix} v11 & v12 \\ v21 & v22 \\ v31 & v32 \end{bmatrix}$$

$$H*W = \begin{bmatrix} u11 & u12 & u13 \\ u21 & u22 & u23 \\ u31 & u32 & u33 \end{bmatrix} * \begin{bmatrix} \lambda_1^{1/2} & 0 & 0 \\ 0 & \lambda_2^{1/2} & 0 \\ 0 & 0 & \lambda_3^{1/2} \end{bmatrix} * \begin{bmatrix} 1 & 0 & 0 \\ 0 & 1 & 0 \\ 0 & 0 & 0 \end{bmatrix}$$

$$H*W = \begin{bmatrix} u11 & u12 & u13 \\ u21 & u22 & u23 \\ u31 & u32 & u33 \end{bmatrix} * \begin{bmatrix} \lambda_1^{1/2} & 0 & 0 \\ 0 & \lambda_2^{1/2} & 0 \\ 0 & 0 & 0 \end{bmatrix}$$

Multiplying by $U^T$ at the receiver the channel becomes, $$\begin{bmatrix} \lambda_1^{1/2} & 0 \\ 0 & \lambda_2^{1/2} \\ 0 & 0 \end{bmatrix}$$

Hence the overall channel is decomposed into two independent paths having SNRs of $\lambda_1/v$ and $\lambda_2/v$, where v is the noise variance.

Step 616 involves waterfilling across the subcarriers, where waterfilling is a technique used to further enhance the performance of the MIMO wireless link by adding power to certain subcarriers, resulting in the optimal allocation of power to the eigenmodes with the constraint that the total power remains the same.

For a 3×3 MIMO wireless link with two streams, beamforming with waterfilling can be represented as, $$\begin{bmatrix} x1 \\ x2 \\ x3 \end{bmatrix} = \begin{bmatrix} v11 & v12 \\ v21 & v22 \\ v31 & v32 \end{bmatrix} * \begin{bmatrix} \varphi 1 & 0 \\ 0 & \varphi 2 \end{bmatrix} * \begin{bmatrix} s1 \\ s2 \end{bmatrix}$$

Where $\Phi_m^2$ is the power allocated to the $m^{th}$ eigenmode and $\Sigma\Phi_m^2 = 1$ Hence the beamforming matrix W can be computed as, $$W' = \begin{bmatrix} v11 & v12 \\ v21 & v22 \\ v31 & v32 \end{bmatrix} * \begin{bmatrix} \varphi1 & 0 \\ 0 & \varphi2 \end{bmatrix}$$

One use of waterfilling is to enable a maximum information rate. The waterfilling equation for maximum information rate is given by $$\Phi_m^2 = (\mu - \nu/\lambda_m)^+$$

where:
$\lambda_m$ is the $m^{th}$ eigenvalue,
$\nu$ is the noise variance,
$(.)^+$ Indicates that the value equals 0 if the expression is negative,
$\mu$ is the waterline and is selected based on the power constraint $\Sigma \Phi_m^2 = 1$ In order to achieve the maximum information rate, the bit rate for each stream has to be allocated based on its corresponding SNR.

Another application of waterfilling is based on minimum mean square error (MMSE) across streams. The waterfilling equation for minimum mean square error across streams is given by $$\Phi_m^2 = (\mu(\nu/\lambda_m)^{1/2} - \nu/\lambda_m)$$

This waterfilling solution is preferred when both the streams are constrained to have equal rates.

Figure 7:
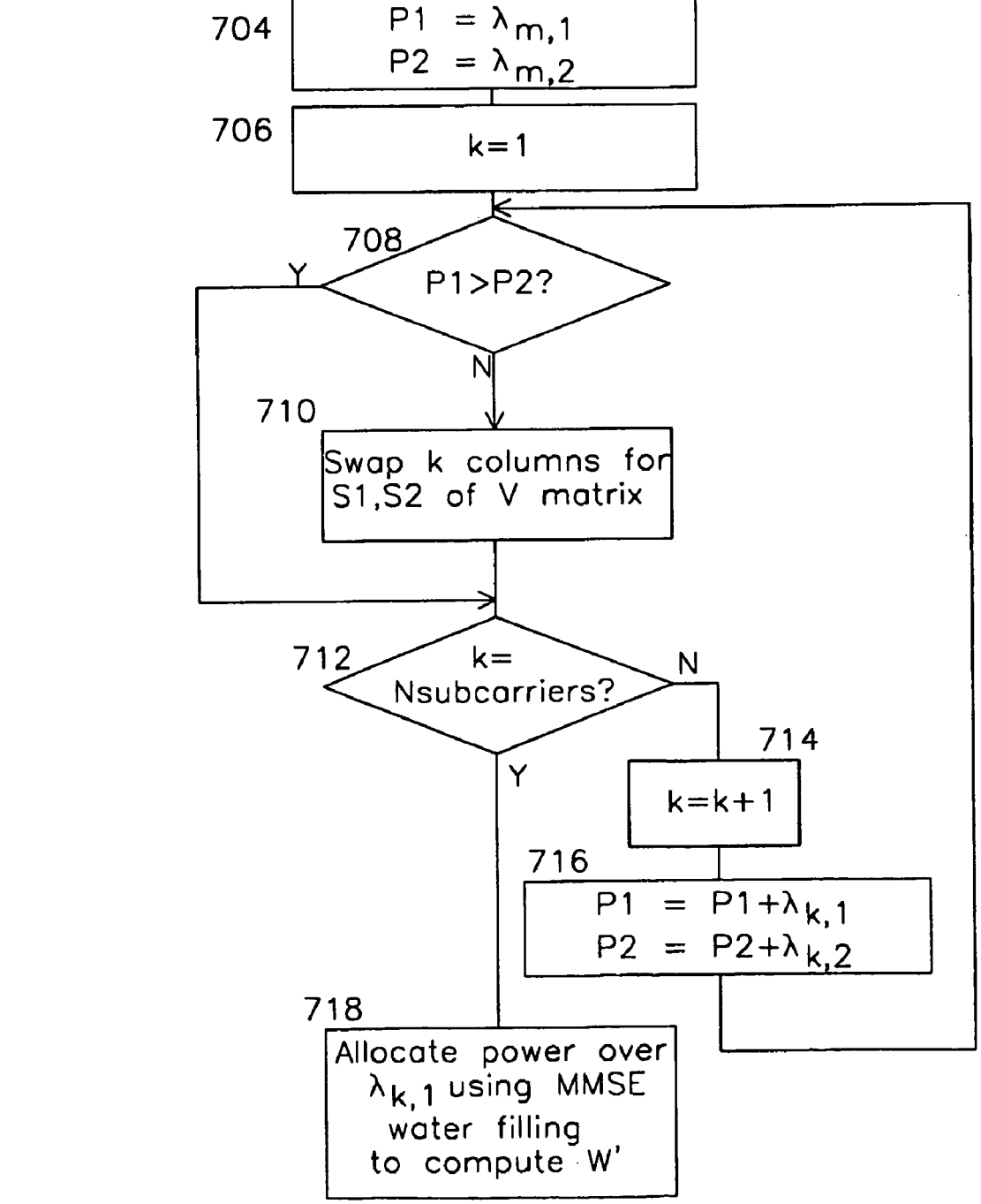
FIG. 7 shows an alternative process for computing a W' matrix.

Another waterfilling solution is waterfilling across OFDM Subcarriers. The total number of channels in a MIMO OFDM link is N*S where S is the number of spatial streams and N is the number of subcarriers. For optimal power allocation at the transmitter, the waterfilling algorithm should operate over all the available subcarriers as well as the eigenmodes. The MMSE waterfilling solution is this case is given by:

$$\Phi_{k,m}^2 = (\mu(\nu/\lambda_{k,m})^{1/2} - \nu/\lambda_{k,m})$$

$$\Sigma \Phi_{k,m}^2 = N\text{subcarriers}$$

Where the objective is to ensure approximately an equal distribution of signal strengths across the two streams, the flowchart in FIG. 7 describes an alternative technique which that does not require the sorting of eigenvalues, and instead relies on the accumulated stream strengths P1 and P2 for associated streams S1 and S2. The H matrix is used to generate new matricies using the relationship $U\Sigma V^T = H$, as was described previously. The eigenvalues of $\Sigma$ are extracted for each subcarrier as was described previously, and P1 and P2 are initialized as the first eigenvalue for the first and second stream in step 704. A subcarrier iteration variable k is initialized in step 706, and steps 708 and 710 swap the kth columns for streams 1 and 2 of the V matrix used to form the W beamforming matrix. If the remaining subcarriers have not been tested 712 for relative stream strength, the subcarrier iteration variable k increments 714, accumulation variables P1 and P2 continue to accumulate the strongest and weakest eigenvalues, and the process of sorting streams by strength continues in testing step 708 and associated column swapping step 710. When P1 and P2 accumulations have been compared 708 for all subcarriers and columns swapped 710 according to accumulated stream strength, the waterfilling steps may be performed 718 as described earlier. The advantage of the process of FIG. 7 is that it relies on the computationally simpler accumulation of subcarrier eigenvalue strengths in P1 and P2, rather than sorting the subcarrier eigenvalues as was done in step 604 of FIG. 6, which accumulated stream strength removes the need for sorting by taking advantage of the eigenvalue separation shown in FIG. 5.

The number of iterations required on an average for computing the waterfilling coefficients is significantly reduced compared to prior art waterfilling. For a 2×2 system, the number of iterations to converge within 1 dB of the power constraint could be as high as 12. However, with the eigenvalue spreading shown in FIG. 5, the power constraint is usually met in one iteration.

We claim:

1. A method for computing a transmit beamforming W matrix for a plurality M streams of data over N subcarriers, the method comprising:
   a first step of measuring a receive channel characteristic H matrix;
   a second step of a transmit beamformer decomposing said H matrix into a U matrix which is formed from the left eigenvectors of said H matrix, an $\Sigma$ matrix which is a diagonal matrix formed from the square roots of the eigenvalues of said H matrix, and a $V^T$ matrix with rows comprising the right eigenvectors of H, such that $U\Sigma V^T = H$;
   where said transmit beamforming W matrix is derived from said V matrix by swapping the strongest column of said V matrix with a different column of said V matrix when a first said eigenvalue associated with said strongest column is greater than a second said eigenvalue corresponding to said different column, said V matrix containing at least two non-zero columns.

2. The method of claim 1 where deriving said W matrix includes waterfilling at least one said subcarrier.

3. The method of claim 1 where deriving said W matrix includes waterfilling each subcarrier using a minimum mean square error for each said subcarrier.

4. The method of claim 3 where said waterfilling using a minimum mean square error comprises computing a power contribution for each k subcarriers and each of m streams according to:

$$\phi_{k,m}^2 = (u(\nu/\lambda_{k,m})^{1/2} - \nu/\lambda_{k,m})$$

$$\sum \phi_{k,m}^2 = N\text{subcarriers}$$

where Nsubcarriers is equal to said N.

5. The method of claim 1 where said transmit beamforming W matrix is derived from said V matrix by sorting said eigenvalues for each said subcarrier.

6. The method of claim 1 where said second step includes selecting the strongest two eigenvalues for each subcarrier and using the columns of $V^T$ associated with said strongest two eigenvalues to form said W matrix.

7. A method for forming a beamforming matrix W from a channel characterization matrix H, each said W and said H having a value for each of N subcarriers, the method having the steps:
   a first step of a transmit beamformer decomposing, for each said subcarrier, said H matrix into a U matrix which is formed from the left eigenvectors of said H matrix, a $\Sigma$ matrix which is a diagonal matrix formed from the square roots of the eigenvalues of said H matrix, and a $V^T$ matrix with rows comprising the right eigenvectors of H, such that $U\Sigma V^T = H$;

a second step of sorting said eigenvalues in descending order for each said subcarrier;

a third step of arranging the columns of said $V^T$ matrix such that each column associated with a particular eigenvalue is ordered according to the order of said eigenvalues for each said subcarrier;

a fourth step of arranging the relative strength of each subcarrier using a waterpouring subcarrier equalization method.

8. The method of claim 7 where said waterpouring subcarrier equalization method operates over all eigenmodes and subcarriers.

9. The method of claim 7 where said waterpouring subcarrier equalization method is minimum square error constrained by:

$$\Phi_m^2 = (\mu(\nu/\lambda_m)^{1/2} - \nu/\lambda_m)$$

where:
$\lambda_m$ is the $m^{th}$ eigenvalue,
$\nu$ is the noise variance,
$\mu$ is the waterline and is selected based on the power constraint $$\sum \phi_m^2 = 1.$$

10. A method for forming a beamforming matrix W from a channel characterization matrix H, each said W and said H having a first stream value and a second stream value for each of N subcarriers, the method having the steps:

a first step of decomposing, for each said subcarrier, said H matrix into a U matrix which is formed from the left eigenvectors of said H matrix, a $\Sigma$ matrix which is a diagonal matrix formed from the square roots of the eigenvalues of said H matrix and re-ordered by strength, and a $V^T$ matrix with rows comprising the right eigenvectors of H, such that $U\Sigma V^T = H$;

a second step of initializing a first accumulator value to the eigenvalue for a first stream, a second accumulator value to the eigenvalue for a second stream, and a subcarrier iteration variable k to a first value;

iterate over all said subcarriers using said variable k, where:
if said first accumulator value is greater than said second accumulator value, swapping said kth columns associated with a first stream and a second stream of said V matrix;
incrementing said k and adding an eigenvalue for a first stream to said first accumulator value, and adding an eigenvalue for a second stream to said second accumulator value;

thereafter waterfilling each subcarrier W matrix value.

11. The method of claim 10 where deriving said W matrix includes waterfilling each subcarrier using a minimum mean square error for each said subcarrier.

12. The method of claim 10 where said waterfilling using a minimum mean square error comprises computing a power contribution for each k subcarriers and each of m streams according to:

$$\phi_{k,m}^2 = (u(\nu/\lambda_{k,m})^{1/2} - \nu/\lambda_{k,m})$$

$$\sum \phi_{k,m}^2 = N subcarriers$$

where Nsubcarriers is equal to said N.

13. The method of claim 10 where said transmit beamforming W matrix is derived from said V matrix by sorting said eigenvalues for each said subcarrier.

14. The method of claim 10 where said second step includes selecting the strongest two eigenvalues and using the columns of $V^T$ associated with said strongest two eigenvalues to form said W matrix.

\* \* \* \* \*